US008281768B2

(12) United States Patent

Cinpinski et al.

(10) Patent No.: US 8,281,768 B2
(45) Date of Patent: Oct. 9, 2012

(54) METHOD AND APPARATUS FOR CONTROLLING FUEL RAIL PRESSURE USING FUEL PRESSURE SENSOR ERROR

(75) Inventors: Kenneth J. Cinpinski, Ray, MI (US); Donovan L. Dibble, Utica, MI (US); Byungho Lee, Ann Arbor, MI (US); Scot A. Douglas, Canton, MI (US); Joseph R. Dulzo, Novi, MI (US)

(73) Assignee: GM Global Technology Operations LLC

( * ) Notice: Subject to any disclaimer, the term of this patent is extended or adjusted under 35 U.S.C. 154(b) by 866 days.

(21) Appl. No.: 12/397,659

(22) Filed: Mar. 4, 2009

(65) Prior Publication Data

US 2010/0224169 A1 Sep. 9, 2010

(51) Int. Cl.
*F02M 59/36* (2006.01)
*G01M 15/00* (2006.01)

(52) U.S. Cl. ...... 123/458; 701/107; 701/114; 73/114.43

(58) Field of Classification Search .................. 123/446, 123/447, 458, 198 D, 479; 73/114.43; 701/103, 701/107, 114, 115
See application file for complete search history.

(56) References Cited

U.S. PATENT DOCUMENTS

| | | | | |
|---|---|---|---|---|
| 5,355,859 | A | 10/1994 | Weber | |
| 5,605,133 | A | 2/1997 | Tuckey | |
| 5,727,515 | A * | 3/1998 | Biester | 123/198 D |
| 6,085,728 | A * | 7/2000 | Grosser et al. | 123/447 |
| 6,283,108 | B1 * | 9/2001 | Matsufuji et al. | 123/690 |
| 6,581,574 | B1 | 6/2003 | Moran et al. | |
| 6,871,633 | B1 * | 3/2005 | Date et al. | 123/447 |
| 6,948,480 | B2 * | 9/2005 | Eser et al. | 123/495 |
| 7,137,294 | B2 * | 11/2006 | Eser et al. | 73/114.51 |
| 7,370,638 | B2 * | 5/2008 | Hayakawa | 123/467 |
| 7,444,993 | B2 * | 11/2008 | Hofmeister | 123/479 |
| 7,987,704 | B2 * | 8/2011 | Lucido et al. | 73/114.43 |
| 8,024,104 | B2 * | 9/2011 | Mueller et al. | 701/104 |
| 8,050,845 | B2 * | 11/2011 | Katsura | 701/103 |
| 8,091,532 | B2 * | 1/2012 | Wang et al. | 123/446 |
| 2002/0117150 | A1 * | 8/2002 | Sykes | 123/458 |
| 2003/0121501 | A1 * | 7/2003 | Barnes et al. | 123/446 |
| 2004/0200456 | A1 * | 10/2004 | Eser et al. | 123/458 |
| 2006/0243244 | A1 * | 11/2006 | Kasbauer et al. | 123/333 |
| 2007/0079792 | A1 * | 4/2007 | Dingler et al. | 123/198 D |
| 2007/0079808 | A1 * | 4/2007 | Takahashi | 123/447 |
| 2007/0209430 | A1 * | 9/2007 | Awano et al. | 73/119 A |
| 2007/0246021 | A1 * | 10/2007 | Takayanagi et al. | 123/497 |
| 2008/0006245 | A1 * | 1/2008 | Casarella et al. | 123/479 |
| 2009/0151700 | A1 * | 6/2009 | Kondoh | 123/457 |
| 2010/0206269 | A1 * | 8/2010 | Cinpinski et al. | 123/456 |
| 2010/0269791 | A1 * | 10/2010 | Lucido et al. | 123/456 |
| 2010/0274462 | A1 * | 10/2010 | Wang et al. | 701/102 |
| 2010/0280741 | A1 * | 11/2010 | Wang et al. | 701/103 |

* cited by examiner

*Primary Examiner* — Thomas Moulis

(57) ABSTRACT

A control system and method for controlling a fuel system of an engine includes a steady state determination module determining the engine is operating at a steady state and a memory storing a first fuel correction. A fuel pump control module commands a predetermined fuel rail pressure change. The memory stores a second fuel correction after the predetermined fuel rail pressure change. A sensor error correction module determines a fuel rail pressure sensor error based on the first fuel correction and the second fuel correction and determines a fuel rail pressure in response to the sensor error.

20 Claims, 5 Drawing Sheets

METHOD AND APPARATUS FOR CONTROLLING FUEL RAIL PRESSURE USING FUEL PRESSURE SENSOR ERROR

FIELD

The present disclosure relates to vehicle control systems and more particularly to vehicle control systems for controlling fuel rail pressure using fuel pressure sensor error.

BACKGROUND

Direct injection gasoline engines are currently used by many engine manufacturers. In a direct injection engine, highly pressurized gasoline is injected via a common fuel rail directly into a combustion chamber of each cylinder. This is different than conventional multi-point fuel injection that is injected into an intake tract or cylinder port.

Gasoline-direct injection enables stratified fuel-charged combustion for improved fuel efficiency and reduced emissions at a low load. The stratified fuel charge allows ultra-lean burn and results in high fuel efficiency and high power output. The cooling effect of the injected fuel and the even dispersion of the air-fuel mixture allows for more aggressive ignition timing curves. Ultra lean burn mode is used for light-load running conditions when little or no acceleration is required. Stoichiometric mode is used during moderate load conditions. The fuel is injected during the intake stroke and creates a homogenous fuel-air mixture in the cylinder. A fuel power mode is used for rapid acceleration and heavy loads. The air-fuel mixture in this case is a slightly richer than stoichiometric mode which helps reduce knock.

Direct-injected engines are configured with a high-pressure fuel pump used for pressurizing the injector fuel rail. A pressure sensor is attached to the fuel rail for control feedback. The pressure sensor provides an input to allow the computation of the pressure differential information used to calculate the injector pulse width for delivering fuel to the cylinder. Errors in the measured fuel pressure at the fuel rail result in an error in the mass of the fuel delivered to the individual cylinder.

SUMMARY

The present disclosure provides a method and system by which an error from the pressure sensor in the fuel rail may be quantified and used for closed-loop control. This will result in the proper mass of fuel being delivered to the individual cylinder. This may also allow for diagnostics of the fuel rail pressure sensor.

In one aspect of the invention, a method includes operating the engine at a steady state, storing a first fuel correction, commanding a predetermined fuel rail pressure change, storing a second fuel correction after commanding, determining a fuel rail pressure sensor error based on the first fuel correction and the second fuel correction and determining a fuel rail pressure in response to the sensor error.

In a further aspect of the invention, a control system for controlling a fuel system of an engine includes a steady state determination module determining the engine is operating at a steady state and a memory storing a first fuel correction. A fuel pump control module commands a predetermined fuel rail pressure change. The memory stores a second fuel correction after the predetermined fuel rail pressure change. A sensor error correction module determines a fuel rail pressure sensor error based on the first fuel correction and the second fuel correction and determines a fuel rail pressure in response to the sensor error.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the disclosure, its application, or uses. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the term boost refers to an amount of compressed air introduced into an engine by a supplemental forced induction system such as a turbocharger. The term timing refers generally to the point at which fuel is introduced into a cylinder of an engine (fuel injection) is initiated.

Figure 1:
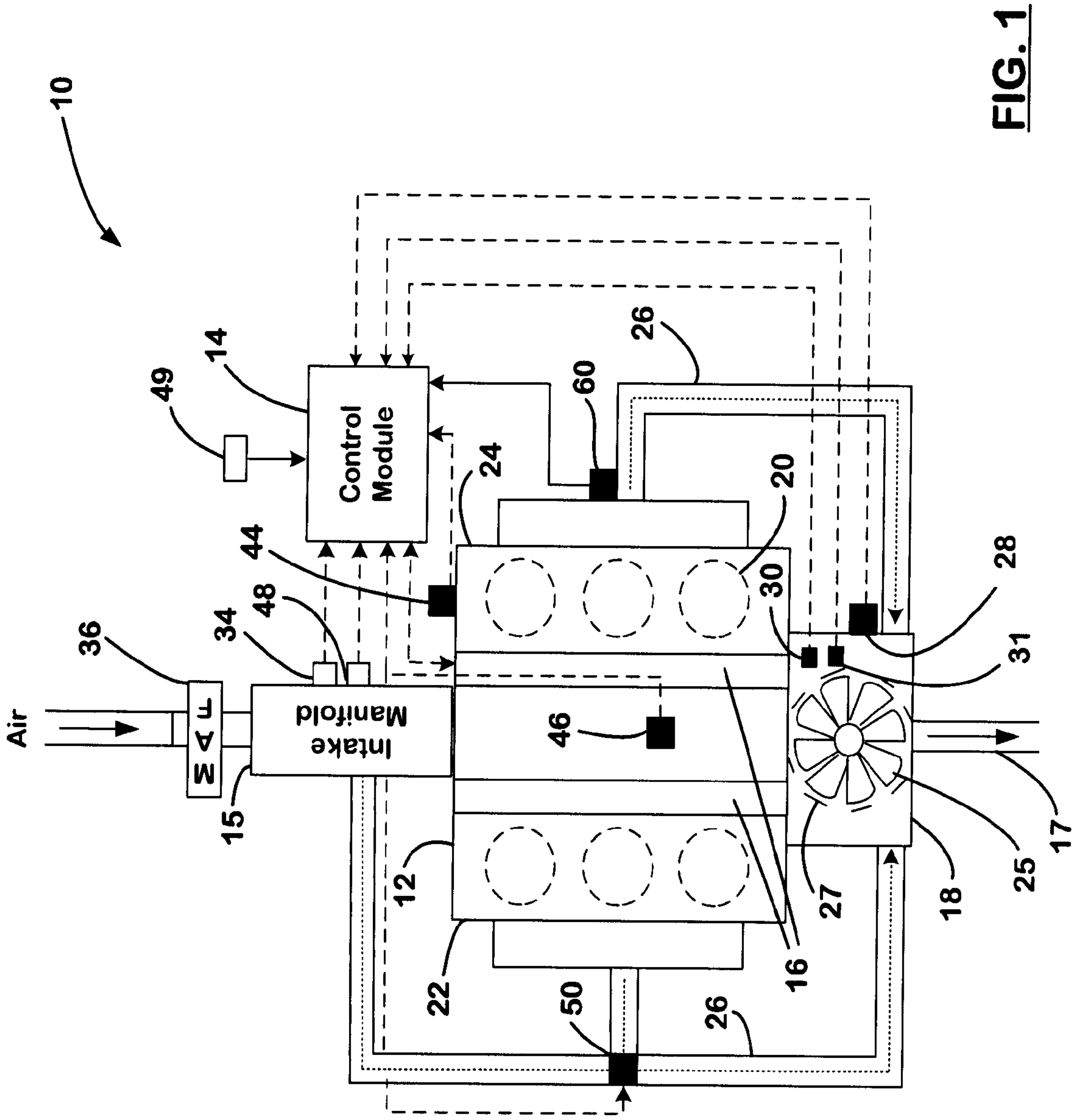
FIG. 1 is a functional block diagram of a control system that adjusts engine timing based on vehicle speed according to some implementations of the present disclosure.

Referring now to FIG. 1, an exemplary engine control system 10 is schematically illustrated in accordance with the present disclosure. The engine control system 10 includes an engine 12 and a control module 14. The engine 12 can further include an intake manifold 15, a fuel injection system 16 having fuel injectors (illustrated in FIG. 2), an exhaust system 17 and a turbocharger 18. The exemplary engine 12 includes six cylinders 20 configured in adjacent cylinder banks 22, 24 in a V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated. It is also anticipated that the engine 12 can have an inline-type cylinder configuration. While a gasoline powered internal combustion engine utilizing direct injection is contemplated, the disclosure may also apply to diesel or alternative fuel sources.

During engine operation, air is drawn into the intake manifold 15 by the inlet vacuum created by the engine intake stroke. Air is drawn into the individual cylinders 20 from the intake manifold 15 and is compressed therein. Fuel is injected by the injection system 16, which is described further in FIG.

2. The air/fuel mixture is compressed and the heat of compression and/or electrical energy ignites the air/fuel mixture. Exhaust gas is exhausted from the cylinders 20 through exhaust conduits 26. The exhaust gas drives the turbine blades 25 of the turbocharger 18 which in turn drives compressor blades 25. The compressor blades 25 can deliver additional air (boost) to the intake manifold 15 and into the cylinders 20 for combustion.

The turbocharger 18 can be any suitable turbocharger such as, but not limited to, a variable nozzle turbocharger (VNT). The turbocharger 18 can include a plurality of variable position vanes 27 that regulate the amount of air delivered from the vehicle exhaust 17 to the engine 12 based on a signal from the control module 14. More specifically, the vanes 27 are movable between a fully-open position and a fully-closed position. When the vanes 27 are in the fully-closed position, the turbocharger 18 delivers a maximum amount of air into the intake manifold 15 and consequently into the engine 12. When the vanes 27 are in the fully-open position, the turbocharger 18 delivers a minimum amount of air into the engine 12. The amount of delivered air is regulated by selectively positioning the vanes 27 between the fully-open and fully-closed positions.

The turbocharger 18 includes an electronic control vane solenoid 28 that manipulates a flow of hydraulic fluid to a vane actuator (not shown). The vane actuator controls the position of the vanes 27. A vane position sensor 30 generates a vane position signal based on the physical position of the vanes 27. A boost sensor 31 generates a boost signal based on the additional air delivered to the intake manifold 15 by the turbocharger 18. While the turbocharger implemented herein is described as a VNT, it is contemplated that other turbochargers employing different electronic control methods may be employed.

A manifold absolute pressure (MAP) sensor 34 is located on the intake manifold 15 and provides a (MAP) signal based on the pressure in the intake manifold 15. A mass air flow (MAF) sensor 36 is located within an air inlet and provides a mass air flow (MAF) signal based on the mass of air flowing into the intake manifold 15. The control module 14 uses the MAF signal to determine the A/F ratio supplied to the engine 12. An RPM sensor 44 such as a crankshaft position sensor provides an engine speed signal. An intake manifold temperature sensor 46 generates an intake air temperature signal. The control module 14 communicates an injector timing signal to the injection system 16. A vehicle speed sensor 49 generates a vehicle speed signal.

The exhaust conduits 26 can include an exhaust recirculation (EGR) valve 50. The EGR valve 50 can recirculate a portion of the exhaust. The controller 14 can control the EGR valve 50 to achieve a desired EGR rate.

The control module 14 controls overall operation of the engine system 10. More specifically, the control module 14 controls engine system operation based on various parameters including, but not limited to, driver input, stability control and the like. The control module 14 can be provided as an Engine Control Module (ECM).

The control module 14 can also regulate operation of the turbocharger 18 by regulating current to the vane solenoid 28. The control module 14 according to an embodiment of the present disclosure can communicate with the vane solenoid 28 to provide an increased flow of air (boost) into the intake manifold 15.

An exhaust gas oxygen sensor 60 may be placed within the exhaust manifold or exhaust conduit to provide a signal corresponding to the amount of oxygen in the exhaust gasses.

Figure 2:
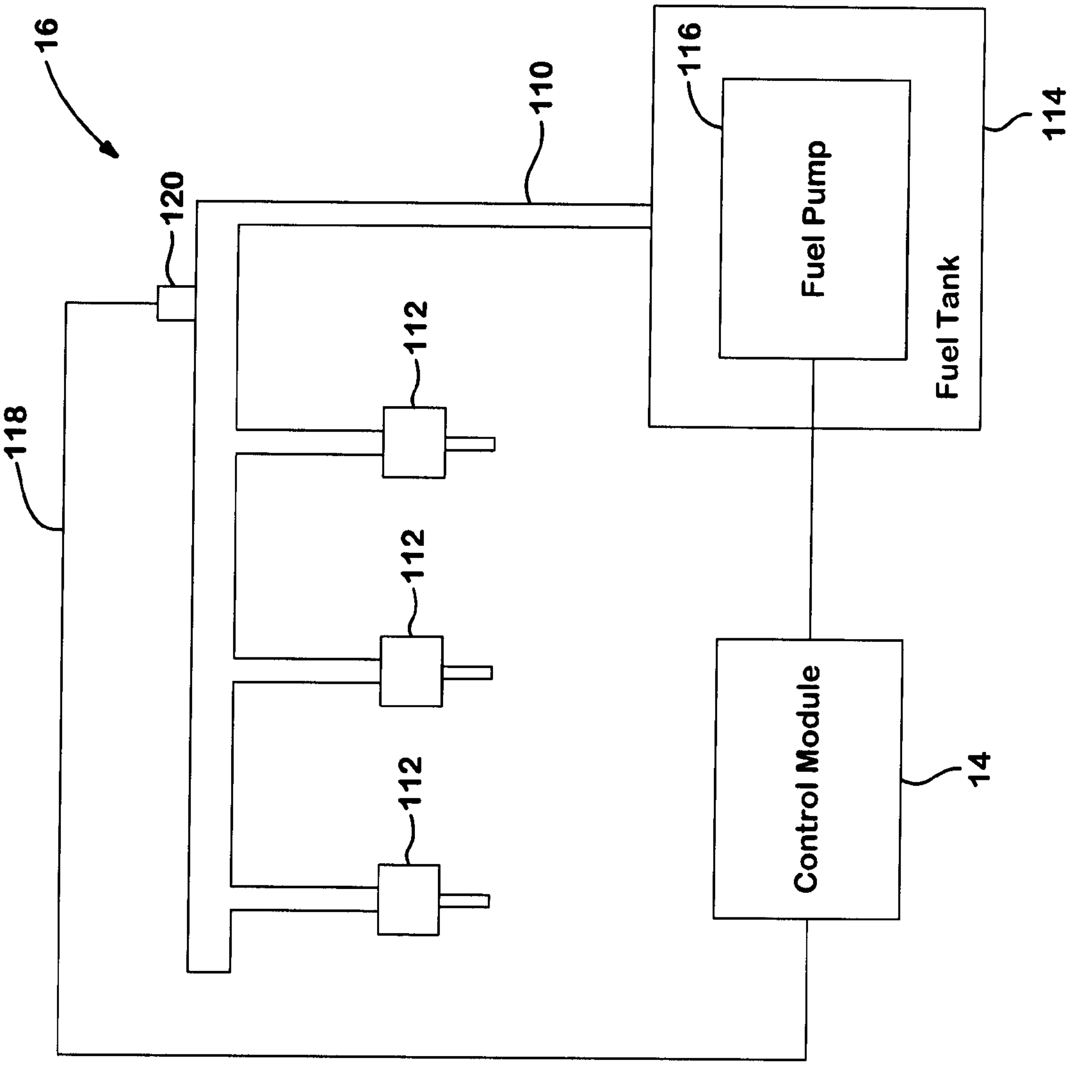
FIG. 2 is a functional block diagram of the fuel injection system according to the present disclosure.

Referring now to FIG. 2, the fuel injection system 16 is shown in further detail. A fuel rail 110 is illustrated having fuel injectors 112 that deliver fuel to cylinders of the engine. It should be noted that the fuel rail 110 is illustrated having three fuel injectors 112 corresponding to the three cylinders of one bank of cylinders of the engine 12 of FIG. 1. More than one fuel rail 110 may be provided on a vehicle. Also, more or fewer fuel injectors may also be provided depending on the configuration of the engine. The fuel rail 110 delivers fuel from a fuel tank 114 through a high-pressure fuel pump 116. The control module 114 controls the fuel pump 116 in response to various sensor inputs including an input signal 118 from a pressure sensor 120. The operation of the system will be further described below.

Figure 3:
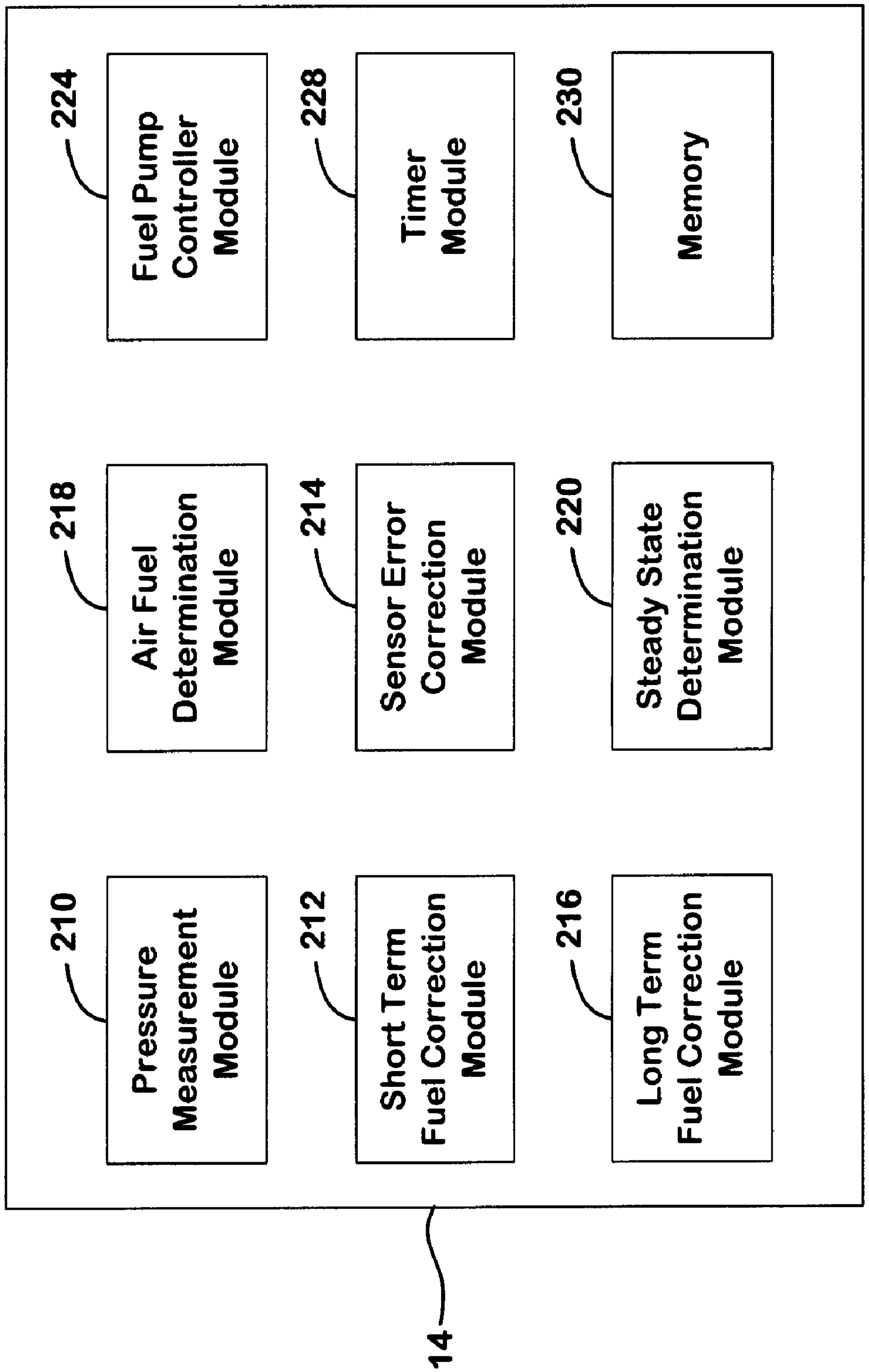
FIG. 3 is a block diagram of the control system of FIG. 1 for performing the method of the present disclosure.

Referring now to FIG. 3, a simplified block diagrammatic view of the control module 14 is illustrated. The control module 14 may include various modules therein to perform the method of the present disclosure. A pressure measurement module 210 is used to obtain a pressure measurement from the pressure sensor. A short-term fuel correction module 212 is used to provide a short-term fuel correction signal. The short-term fuel correction signal may be used by a sensor error correction module 214 for determining a pressure sensor error. Likewise, a long-term fuel correction module 216 is used to generate a long-term fuel correction signal that also may be used by the sensor error correction module 214.

An air-fuel determination module 218 may be used to determine if the air-fuel ratio is rich or lean. The air-fuel determination module may determine the rich or lean status based upon a block learn multiplier (BLM) signal which is the long-term fuel correction signal. The BLM signal is described below.

A steady state determination module 220 is used to determine whether the engine is being operated at steady state. As will be described below, determining an error for a pressure sensor in the fuel rail may be performed when the engine is operated at steady state. Steady state may include when the crank shaft speed is steady, the load as determined by the manifold absolute pressure is steady, or the block learn multiplier (BLM) is operated within the same cell.

The block learn multiplier (BLM) is a long-term fuel correction that is used to maintain the air-fuel ratio within an acceptable parameter. The long-term fuel adjustment happens about twice per second, whereas the short-term fuel correction (INT) happens about 20 times per second. The cells correspond to various operating ranges corresponding to engine RPM and mass air flow. For example, the crank shaft speed may be divided into a number of regions such as four regions, 0-800 rpm, 800-1100 rpm, 1100-1500 rpm, and above 1500 rpm. The mass air-flow readings may be provided in 0-9 gps, 9-20, gps, 20-30 gps, and above 30 gps. In such a system, 16 cells (four across and four down) may be provided. Of course, the above example is provided for illustration purposes only. Actual values may be different depending on different engines and calibrations. An indication of steady state is when the engine is maintained within a cell. It should be noted that for both short-term and long-term fuel correction values, a higher value represents a correction that adds fuel to the mixture due to higher injector pulse widths. The short-term correction value may be referred to as an integrator value. The integrator values may be adjusted according to exhaust gas oxygen reading from the exhaust gas oxygen sensor 60 illustrated in FIG. 1.

The control module 14 may also include a fuel pump control module 224 used to determine a fuel injector pulse width in response to the pressure measurements and pressure sensor error. The injector pulse width corresponds to the amount of mass of fuel delivered to the cylinder. The fuel pump control module 224 may be a separate module associated with the fuel pump 116 outside control module 14.

A timer module 228 may be used to time various lengths of time including a time since a commanded fuel pressure change was performed. This time corresponds to a delay time as will be further described below. Of course, other timing determinations may also be provided.

A memory 230 may also be included in the control module 14. The memory 230 may store various data and intermediate calculations associated with the various modules 210-228. The memory 230 may be various types of memory including volatile, non-volatile, keep alive or various combinations thereof.

Figure 4:
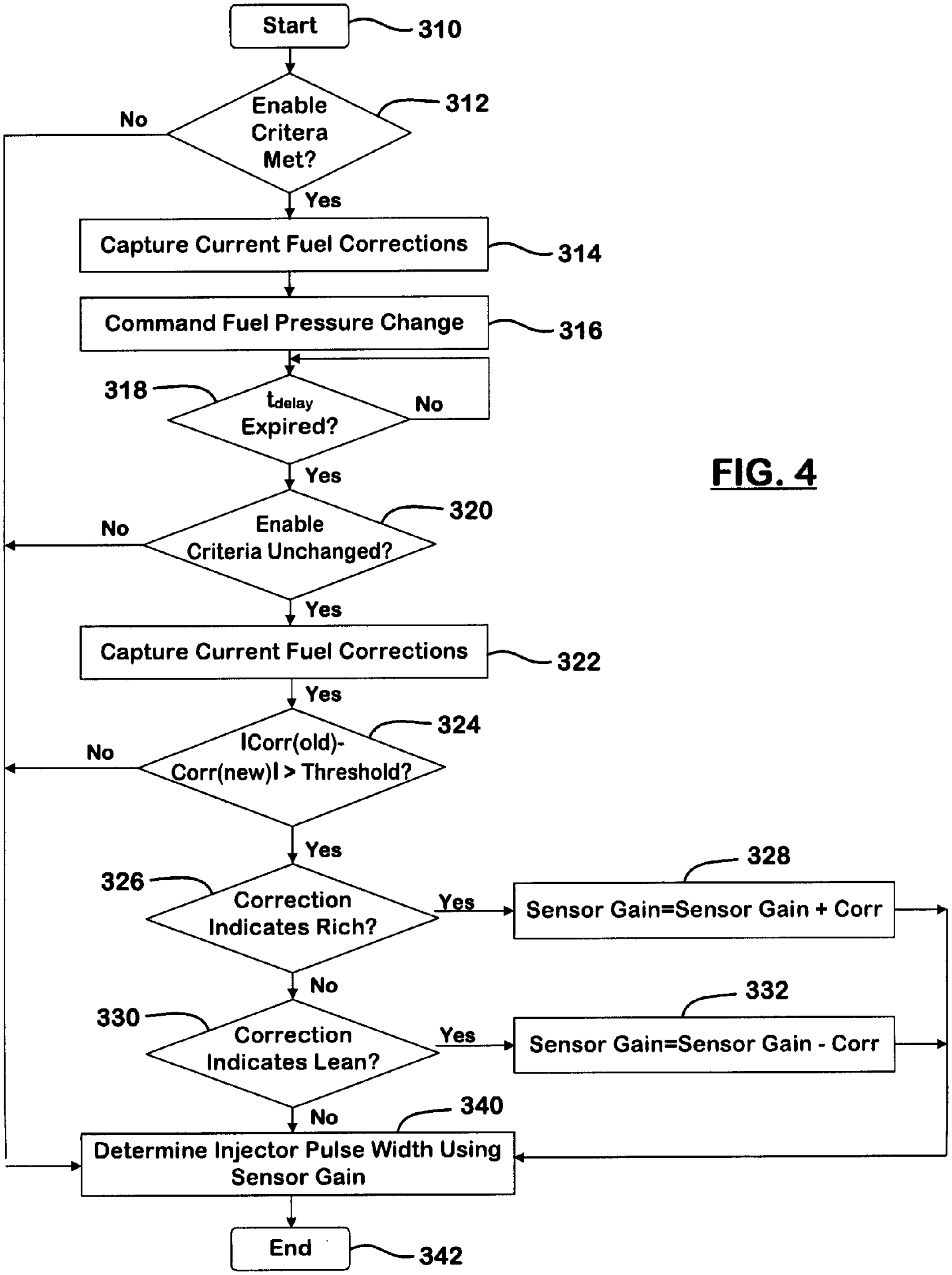
FIG. 4 is a flowchart of a method for determining a pressure sensor error.

Referring now to FIG. 4, a method for determining an injection pulse width is determined. The system starts in step 310. In step 312, the system proceeds to step 314 when enablement criteria are met. Enablement criteria correspond to whether the engine is being operated at steady state. Steady state is used because short- and long-term correction factors will be corrected for any errors in air-fuel ratio. Thus, when a fuel pressure is commanded, the change in fuel correction can be attributed to an error in measured fuel pressure. Various indicators, including the crank shaft speed or RPM, the load as indicated by the manifold absolute pressure and the BLM cell may be used to determine whether the engine is in steady state. The values should be relatively constant to be at steady state. When one or more of the indicators indicate the engine is being operated at a steady state, step 314 captures the current fuel corrections. The current fuel corrections may be a short-term fuel correction or a long-term fuel correction, or both. However, as described below, only a long-term correction could be used. As mentioned above, the short-term correction may be referred to as an integrator (INT) correction and the long-term correction may be referred to as a block learn multiplier (BLM) correction.

In step 316, a fuel pressure change is commanded by the control module 14 illustrated above. The commanded fuel pressure change may command a pre-determined amount of pressure change. (In the graph of FIG. 5, a change of pressure from 4 MPa to 8 MPa was commanded.) The fuel pressure change in the fuel rail may be manifested by the fuel pump.

A delay time may be provided within the system. The delay time ensures that the commanded fuel pressure change has been implemented. If the delay time has not expired, step 318 is again performed until the delay time has expired. Once the delay time has expired, a check of the enablement criteria is performed in step 320. An indicator that the enablement criteria have changed is whether the BLM remains within the same BLM cell. Of course, the engine RPM and load may also be used as an indicator whether the criteria has changed. In step 320, if the enablement criteria are unchanged, step 322 captures the fuel corrections. Step 322 may capture one or both of the short-term correction or the long-term correction. In step 324, if the old correction from step 314 is subtracted from the new correction in step 322, and the absolute value of the subtraction is above a threshold, step 326 is performed. In step 326, a determination of whether the correction indicates rich or lean may be performed. As mentioned above, a higher value of BLM adds fuel to the mixture. If the correction indicates a rich blend, step 328 determines the sensor gain as the sensor gain plus the new correction. In step 326, if the correction does not indicate rich, step 330 is performed. In step 330, if the system indicates a lean mixture, step 332 calculates the sensor gain as the sensor gain minus the correction factor. After steps 328 and 332, step 340 determines the injector pulse width using the sensor gain. By controlling the injector pulse width, the mass of fuel injected into a cylinder may be controlled.

Referring back to steps 312, 320 and 324, if the enablement criteria are not met in step 312 or the enablement criteria have changed in step 320 or the old correction minus the new correction is not above a threshold, the system ends the process in step 342. Also, the system may end in step 342 after step 330 if the system does not indicate lean.

By determining the sensor gain errors or fuel pressure sensor error, adaptive correction of the pressure sensor value is used to correct fuel pressure sensor reading errors. Also, sensor degradation may also be monitored due to increasing sensor errors. Thus, when sensor degradation takes places, the vehicle operator may be notified through an indicator.

Figure 5:
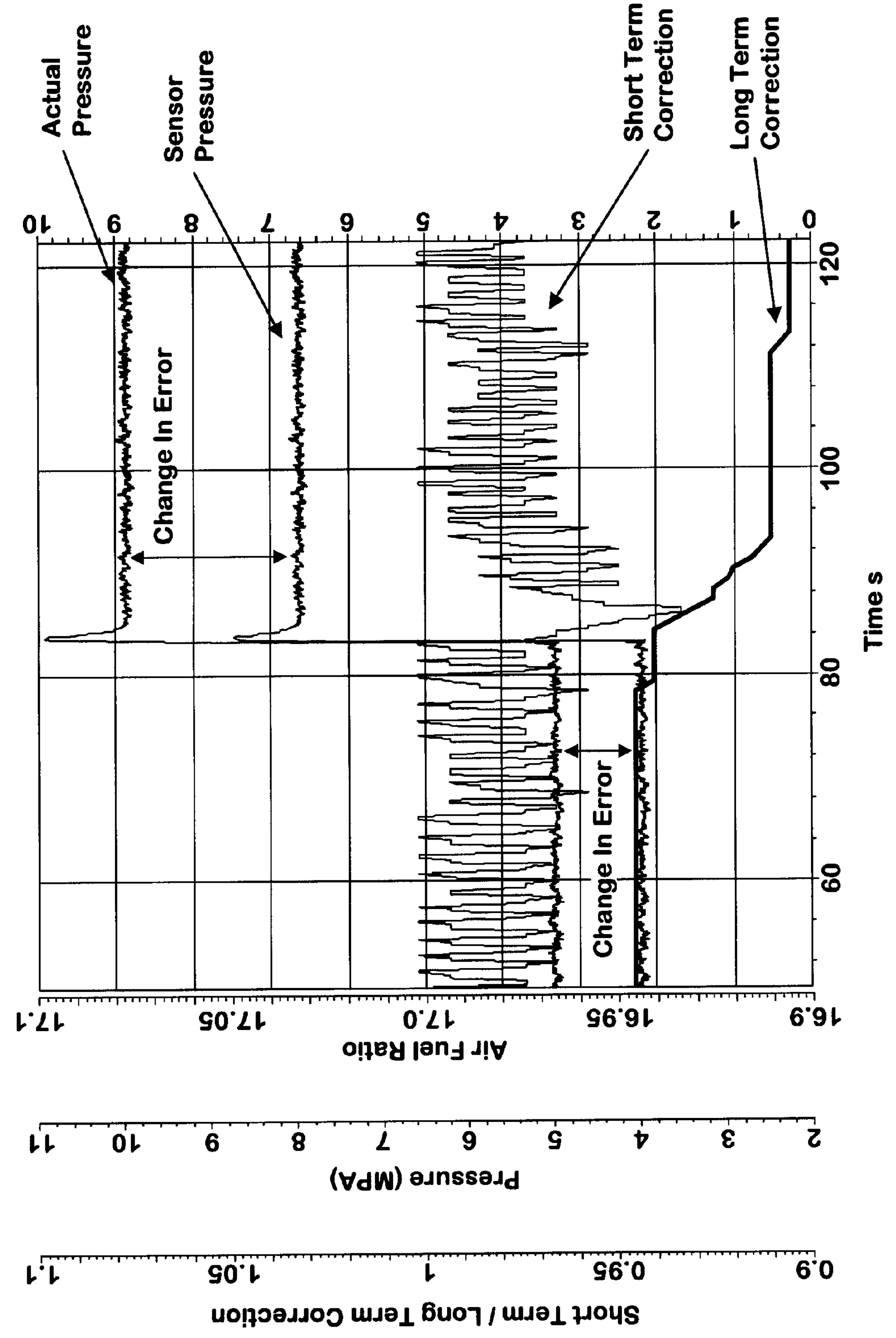
FIG. 5 is a plot of the short-term correction, long-term correction, sensor pressure, actual pressure and pressure sensor error.

Referring now to FIG. 5, a plot illustrating a short-term correction factor, a long-term correction factor and a change in sensor error is illustrated. The change in sensor error is illustrated when a step change between 4 MPa and 8 MPa has been commanded by the control module. As can be seen, the long-term correction is a true indicator of a change in error for the system. The short-term correction adjusts rather quickly after a step change in pressure is commanded.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of controlling an engine fuel rail comprising:
operating an engine at a steady state;
storing a first fuel correction;
commanding a predetermined fuel rail pressure change;
storing a second fuel correction after commanding;
determining a fuel rail pressure sensor error based on the first fuel correction and the second fuel correction; and
determining a fuel rail pressure in response to the fuel rail pressure sensor error.

2. The method as recited in claim 1 further comprising determining an injector pulse width in response to the fuel rail pressure sensor error.

3. The method as recited in claim 1 wherein the first fuel correction and the second fuel correction comprise a respective first long-term fuel correction and a second long-term fuel correction.

4. The method as recited in claim 1 wherein storing a first fuel correction comprises storing a short-term fuel correction and a long-term fuel correction.

5. The method as recited in claim 1 wherein operating the engine at a steady state comprises operating a vehicle at a relatively constant crankshaft speed.

6. The method as recited in claim 1 wherein operating the engine at a steady state comprises operating a vehicle at a relatively constant load.

7. The method as recited in claim 1 wherein operating the engine at a steady state comprises operating a vehicle at a relatively constant manifold absolute pressure.

8. The method as recited in claim 1 wherein operating the engine at a steady state comprises operating a vehicle at a relatively constant long-term fuel correction.

9. The method as recited in claim 1 further comprising after commanding, waiting a predetermined time before storing a second fuel correction.

10. The method as recited in claim 1 wherein operating the engine comprises operating a direct injection engine.

11. The method as recited in claim 1 wherein determining the fuel rail pressure comprises determining when an air fuel mixture is rich, adding the fuel rail pressure sensor error to a fuel rail pressure sensor gain.

12. The method as recited in claim 1 wherein determining the fuel rail pressure comprises determining when an air fuel mixture is lean, subtracting the fuel rail pressure sensor error from a fuel rail pressure sensor gain.

13. The method as recited in clam 1 wherein determining the fuel rail pressure sensor error comprises determining the fuel rail pressure sensor error based on a difference between the first fuel correction and the second fuel correction.

14. A control system for an engine, the control system comprising:

a steady state determination module determining an engine is operating at a steady state;

a memory storing a first fuel correction;

a fuel pump control module commanding a predetermined fuel rail pressure change, said memory storing a second fuel correction after the predetermined fuel rail pressure change; and a sensor error correction module determining a fuel rail pressure sensor error based on the first fuel correction and the second fuel correction and determining a fuel rail pressure in response to the fuel rail pressure sensor error.

15. The control system as recited in claim 14 wherein the fuel pump control module determines an injector pulse width in response to the fuel rail pressure sensor error.

16. The control system as recited in claim 14 wherein the first fuel correction and the second fuel correction comprise a first long-term fuel correction and a second long-term fuel correction.

17. The control system as recited in claim 14 wherein the first fuel correction comprises a short-term fuel correction and a long-term fuel correction.

18. The control system as recited in claim 14 wherein the steady state determination module determines the engine is at a steady state from at least one of a relatively constant crankshaft speed, a relatively constant load, a relatively constant manifold absolute pressure, and a relatively constant long-term fuel correction.

19. The control system as recited in claim 14 further comprising an air fuel determination module that determines when an air fuel mixture is rich or lean and, wherein the sensor error correction module adds the fuel rail pressure sensor error to a fuel rail pressure sensor gain when the air fuel mixture is rich and subtracts the fuel rail pressure sensor error from the fuel rail pressure sensor gain when the air fuel mixture is lean.

20. The control system as recited in clam 14 wherein the fuel rail pressure sensor error is based on a difference between the first fuel correction and the second fuel correction.

* * * * *